US008327649B2

(12) United States Patent
Bishara et al.

(10) Patent No.: US 8,327,649 B2
(45) Date of Patent: Dec. 11, 2012

(54) GAS TURBINE FUEL INJECTOR ASSEMBLY WITH OVERLAPPING FRICTIONALLY ENGAGED MEMBERS FOR DAMPING VIBRATIONS

(75) Inventors: Fady Bishara, Cincinnati, OH (US); Jeffrey Lehtinen, Concord Township, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/053,612

(22) Filed: Mar. 22, 2011

(65) Prior Publication Data

US 2011/0167830 A1 Jul. 14, 2011

Related U.S. Application Data

(62) Division of application No. 11/862,160, filed on Sep. 26, 2007, now Pat. No. 7,966,819.

(60) Provisional application No. 60/826,934, filed on Sep. 26, 2006.

(51) Int. Cl.
*F02C 7/20* (2006.01)

(52) U.S. Cl. ................ 60/800; 60/739; 60/799; 60/740; 138/120

(58) Field of Classification Search .................... 60/799, 60/800, 734, 739, 740; 138/120, 110, 155
See application file for complete search history.

(56) References Cited

U.S. PATENT DOCUMENTS

| | | | | |
|---|---|---|---|---|
| 1,279,803 | A * | 9/1918 | Watson | 248/160 |
| 2,349,016 | A * | 5/1944 | Stephens | 285/223 |
| 3,929,164 | A * | 12/1975 | Richter | 138/120 |
| 4,111,236 | A * | 9/1978 | Moritz | 138/120 |
| 4,258,544 | A * | 3/1981 | Gebhart et al. | 60/800 |
| 4,669,507 | A * | 6/1987 | Moritz | 138/92 |
| 5,134,251 | A * | 7/1992 | Martin | 174/136 |
| 5,215,338 | A * | 6/1993 | Kimura et al. | 285/154.2 |
| 5,353,843 | A * | 10/1994 | Hoag | 138/110 |
| 6,038,852 | A * | 3/2000 | Celi | 60/761 |
| 6,276,141 | B1 * | 8/2001 | Pelletier | 60/740 |
| 6,523,350 | B1 * | 2/2003 | Mancini et al. | 60/740 |
| 6,575,654 | B2 * | 6/2003 | Wentworth et al. | 403/56 |
| 6,648,376 | B2 * | 11/2003 | Christianson | 285/146.1 |
| 6,711,898 | B2 * | 3/2004 | Laing et al. | 60/740 |
| 6,773,297 | B2 * | 8/2004 | Komiya | 439/445 |
| 6,880,341 | B2 * | 4/2005 | Parkman et al. | 60/740 |
| 7,249,461 | B2 * | 7/2007 | Moraes | 60/796 |
| 7,900,456 | B2 * | 3/2011 | Mao | 60/740 |
| 7,942,169 | B2 * | 5/2011 | Komiya et al. | 138/110 |
| 8,047,236 | B2 * | 11/2011 | Perry | 138/120 |
| 2003/0136456 | A1 * | 7/2003 | Blase | 138/120 |
| 2005/0039457 | A1 * | 2/2005 | Moraes | 60/739 |
| 2007/0175929 | A1 * | 8/2007 | Schram | 222/527 |
| 2012/0012220 | A1 * | 1/2012 | Perry | 138/120 |

* cited by examiner

*Primary Examiner* — William H Rodriguez
(74) *Attorney, Agent, or Firm* — Renner, Otto, Boisselle & Sklar, LLP

(57) ABSTRACT

Fuel injector assemblies with frictionally damped fuel supply members, including fuel feed strips. More particularly, the invention provides friction dampers and/or assemblies that frictionally damp movement of fuel supply members in at least one direction. Some of the embodiments provide a friction damper that is easily serviceable, and can be installed after final assembly of a fuel injector. Aspects of the invention are applicable to other components of fuel injectors and gas turbine engines in addition to fuel supply members.

11 Claims, 9 Drawing Sheets

GAS TURBINE FUEL INJECTOR ASSEMBLY WITH OVERLAPPING FRICTIONALLY ENGAGED MEMBERS FOR DAMPING VIBRATIONS

RELATED APPLICATION

This application is a divisional of U.S. patent application Ser. No. 11/862,160 filed on Sep. 26, 2007 now U.S. Pat. No. 7,966,819 which claims the benefit of U.S. Provisional Application No. 60/826,934 filed Sep. 26, 2006, both of which are hereby incorporated herein by reference.

FIELD OF THE INVENTION

The present invention relates generally to fuel injectors. More particularly, the invention relates to fuel injectors for use with gas turbine combustion engines.

BACKGROUND OF THE INVENTION

A gas turbine engine contains a compressor in fluid communication with a combustion system that often contains a plurality of combustors. The compressor raises the pressure of the air passing through each stage of the compressor and directs it to the combustors where fuel is injected and mixed with the compressed air. The fuel and air mixture ignites and combusts creating a flow of hot gases that are then directed into the turbine. The hot gases drive the turbine, which in turn drives the compressor, and for electrical generation purposes, can also drive a generator.

Most combustion systems utilize a plurality of fuel injectors for staging, emissions purposes, and flame stability. Fuel injectors for applications such as gas turbine combustion engines direct pressurized fuel from a manifold to the one or more combustion chambers. Fuel injectors also function to prepare the fuel for mixing with air prior to combustion. Each fuel injector typically has an inlet fitting connected either directly or via tubing to the manifold, a tubular extension or stem connected at one end to the fitting, and one or more spray nozzles connected to the other end of the stem for directing the fuel into the combustion chamber. A fuel passage (e.g., a tube or cylindrical passage) extends through the stem to supply the fuel from the inlet fitting to the nozzle. Appropriate valves and/or flow dividers can be provided to direct and control the flow of fuel through the nozzle and/or fuel passage.

The fuel passage, also referred to as fuel feed member, a fuel feed strip or macrolaminate strip, is typically supported at each end thereof in a cavity within the stem. In a typical fuel injector, the stem is exposed to the high temperatures of the combustor and undergoes thermal expansion in response to the higher temperatures. The fuel feed strip, being cooled by the fuel flowing internally thereto, generally undergoes thermal expansion to a lesser degree than the stem. This difference in thermal expansion can result in undesirable stresses being placed on the fuel feed strip and/or stem. Accordingly, fuel feed strips typically have some axial flexibility to mitigate such stresses.

An example of a fuel feed strip supported at each end within a chamber of a stem is disclosed in U.S. Pat. No. 6,711,898 to Laing et al. The single fuel feed strip (fuel passage) contained in the hollow stem of the injector has a convoluted shape that provides some axial flexibility to allow axial expansion and contraction of the fuel feed strip in response to thermal expansion and/or contraction of the stem and/or fuel feed strip itself.

Of particular concern in the design of any component of a gas turbine engine, and in particular the fuel feed strip, is both high and low cycle fatigue. Low cycle fatigue generally occurs due to thermal expansion and contraction of engine components during operation, as just described. High cycle fatigue generally occurs when resonance or vibration modes are excited by driving frequencies inherent in the operation of the engine. For example, shaft rotation imbalance can produce driving frequencies between about 200 to about 300 Hertz (Hz). Driving frequencies due to combustion rumble can be in the range of about 300 Hz to about 800 Hz. Fuel pump pulsations can produce driving frequencies in the range of 1200 Hz. Blade passing frequencies can be upwards of 1200 Hz.

Prior art fuel injectors have incorporated devices and designs, such as that shown in U.S. Pat. No. 6,038,862, to address the issue of high cycle fatigue. Typically, such devices are intended to damp vibration of the parts to avoid resonance. However, such devices can be complex and require additional parts which can resonate themselves. Further, many such devices must be installed prior to assembly of the fuel injector and are not easily serviced. Some designs can restrict movement of the fuel feed strip in response to thermal expansion of the stem and/or strip and thereby induce undesirable stresses in the assembly.

Another approach has been to alter the natural frequency, also referred to herein as resonant frequency, of the parts. In general, reinforcing ribs and/or additional structure is provided to increase the natural frequency of the part above the anticipated driving frequencies of the turbine. While effective in many applications, the additional structure can be bulky and also tends to increase the stiffness of the parts which can be undesirable in applications where flexibility of the part is desired or necessary. Further, in the event a resonant driving frequency occurs, such approach does not provide damping to dissipate energy from the assembly.

Still another approach has been to alter the natural frequency of the part by shaping the part such that its natural frequency is above the maximum driving frequency the part will experience. For example, U.S. Pat. No. 6,098,407 discloses a fuel injector including a fuel supply tube that is coiled into a 360 degree spiral shape. Ideally, the curvature of the tube is such that the tube's natural frequency is well above the maximum vibratory frequency that the tube will experience during engine operation. Again, while effective for many applications, such approach does not provide damping to dissipate energy from the assembly and thus if a resonant driving frequency occurs, the fuel feed strip can be damaged.

SUMMARY OF THE INVENTION

The present invention provides fuel injector assemblies with frictionally damped fuel supply members, including fuel feed strips. More particularly, the invention provides friction dampers and/or assemblies that frictionally damp movement of fuel supply members in at least one direction. Some of the embodiments provide a friction damper that is easily serviceable, and can be installed after final assembly of a fuel injector. Aspects of the invention are applicable to other components of fuel injectors and gas turbine engines in addition to fuel supply members.

Accordingly, a fuel injector assembly for a gas turbine engine comprises a fuel supply member for providing fuel to a nozzle of the fuel injector, and a damper operatively connected to the fuel supply member for damping movement of the fuel supply member. The damper includes a plurality of overlapping frictionally engaged members secured to the fuel supply member in at least one location along a length thereof such that at least one frictionally engaged member moves in response to movement of the fuel supply member. Friction during relative movement of individual frictionally engaged members damps movement of the fuel supply member.

More particularly, at least one of the plurality of frictionally engaged members can at least partially surround the fuel supply member. Each of the plurality of overlapping frictionally engaged members can be secured to the fuel supply member. Alternatively, the plurality of overlapping frictionally engaged members can be slideably interlinked together, with at least one distal frictionally engaged member secured to the fuel supply member. The fuel supply member can be a tube and the frictionally engaged members can be generally cylindrical in cross-section, or the fuel supply member can be a fuel feed strip and the frictionally engaged members can be generally rectangular in cross-section, for example.

According to another aspect of the invention, the damper includes a plunger supported for axial movement by a damper housing secured to a housing of the fuel injector, the plunger configured to engage a surface of the fuel supply member such that movement of the fuel supply member in at least one direction results in axial movement of the plunger to thereby dampen movement of the fuel supply member.

More particularly, a surface of the plunger slides against the damper housing to frictionally damp movement of the fuel feed strip. The plunger can be biased against the feed strip by at least one spring washer, or a plurality of spring washers wherein movement between adjacent spring washers also acts to frictionally damp movement of the fuel feed strip. The plunger can be biased against the feed strip by a machined spring integral with the damper housing. At least one of the fuel supply member and damper can include a wear surface. The damper can be removable as a unit from the injector assembly and can be generally cylindrical with threads on an outer circumference for mating with threads of a bore in the injector assembly. The fuel supply member can be a tube or a fuel feed strip, for example.

In accordance with another aspect of the invention, the damper includes a tether secured to the fuel feed strip and a housing of the injector assembly to restrain movement of the fuel supply member in at least one direction. The tether can be braided stainless steel, wherein friction between strands of the braided tether frictionally damp movement of the fuel supply member. The tether can include a spring member secured at one end to the housing of the injector assembly, the spring member being preloaded against opposing surfaces of the injector housing and having a contact surface for frictionally engaging a surface of the fuel supply member. Relative movement between the contact surface of the damper spring and the surface of the fuel supply member during movement of the fuel supply member can frictionally damp the fuel supply member. The spring or a portion thereof can be S-shape, and a contact member secured to the fuel supply member can be provided for engaging the contact surface of the spring member.

According to yet another aspect of the invention, the damper includes a leaf spring member operatively connected to the fuel supply member for damping movement thereof. In one embodiment, at least one leg of the leaf spring member is secured to the fuel supply member. The leaf spring member can have a plurality of individual leaf elements configured to move relative to each other during loading of the leaf spring.

According to still another aspect of the invention, a fuel injector assembly for a gas turbine engine comprises a fuel feed strip for providing fuel to a nozzle of the fuel injector, and a damper operatively connected to the fuel feed strip for damping movement of the fuel feed strip. The damper can include a frictionally restrained member biased against the feed strip.

Further features of the invention will become apparent from the following detailed description when considered in conjunction with the drawings.

DETAILED DESCRIPTION

Figure 1:
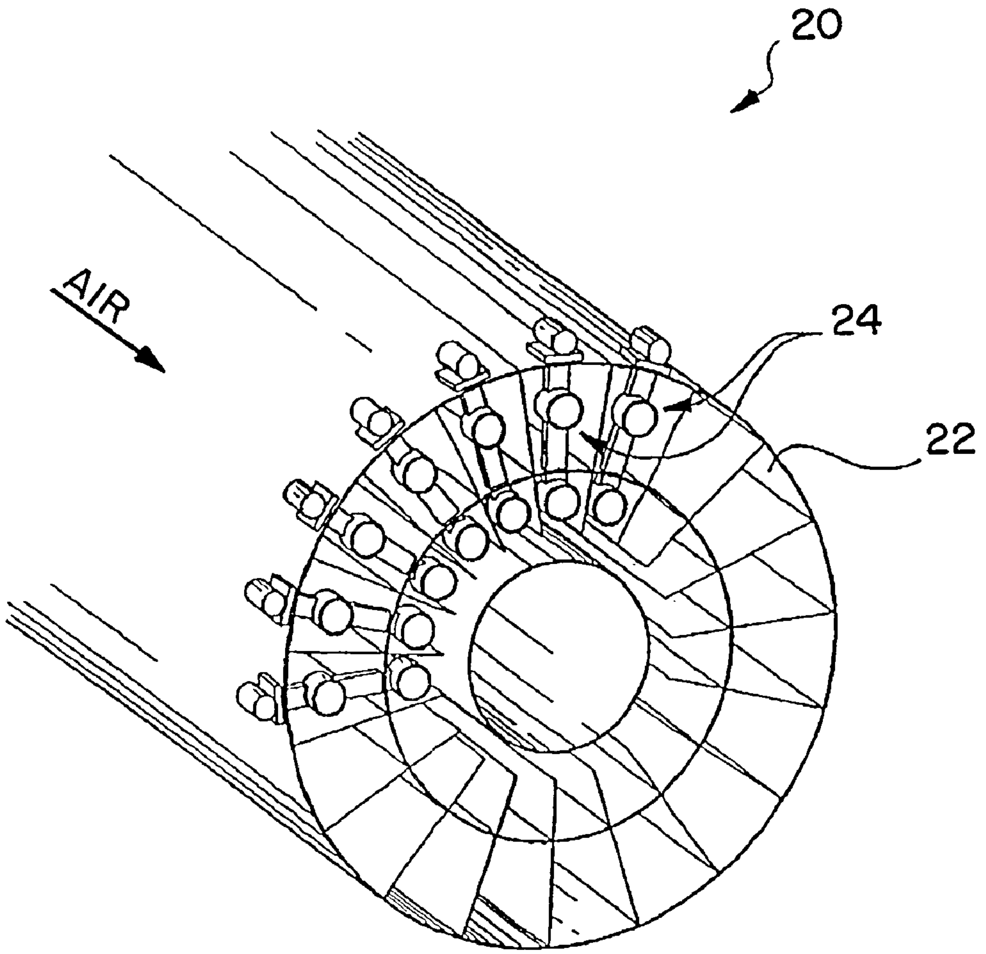
FIG. 1 is a perspective view of the inlet into a dual concentric combustion chamber for a gas turbine engine including a fuel injector assembly according to the prior art.

Referring to the drawings and initially to FIG. 1, a portion of a known combustion engine is indicated generally at 20. The upstream, front wall of a dual combustion chamber for the engine is shown at 22, and a plurality of fuel injectors, for example as indicated generally at 24, are shown supported within the combustion chamber. The fuel injectors 24 atomize and direct fuel into the combustion chamber 22 for burning. Combustion chamber 22 can be any useful type of combustion chamber, such as a combustion chamber for a gas turbine combustion engine of an aircraft, however, the present invention is believed useful for combustion chambers for any type of combustion application, such as in land vehicles. In any case, the combustion chamber will not be described herein for sake of brevity, with the exception that as should be known to those skilled in the art, air at elevated temperatures (up to 1300 degree. F. in the combustion chamber of an aircraft), is directed into the combustion chamber to allow combustion of the fuel.

As illustrated in FIG. 1, a dual nozzle arrangement for each injector is shown, where each of the fuel injectors 24 includes two nozzle assemblies for directing fuel into radially inner and outer zones of the combustion chamber. It should be noted that this multiple nozzle arrangement is only provided for exemplary purposes, and the present invention is useful with a single nozzle assembly, as well as injectors having more than two nozzle assemblies in a concentric or series configuration. It should also be noted that while a number of such injectors are shown in an evenly-spaced annular arrangement, the number and location of such injectors can vary, depending upon the particular application.

Figure 2:
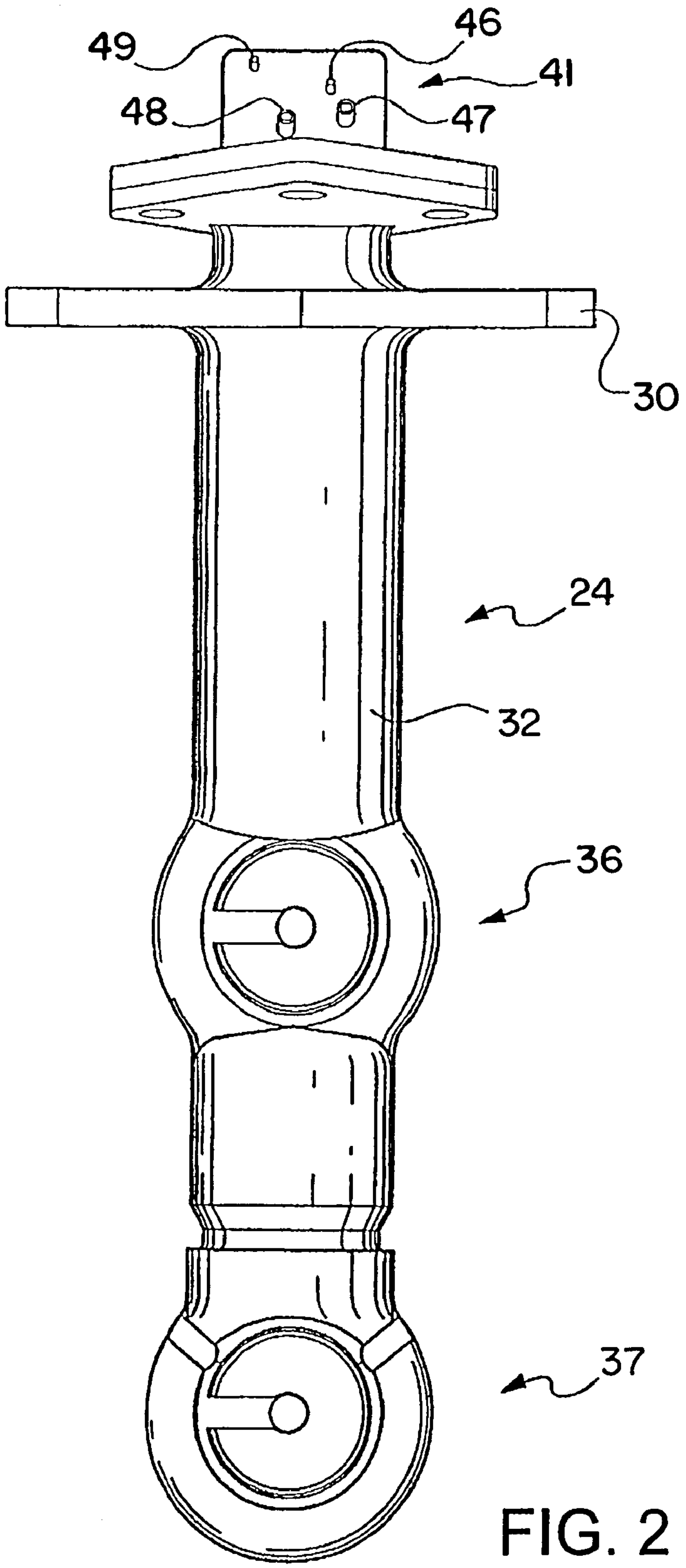
FIG. 2 is a perspective view of a fuel injector for the engine of FIG. 1.
Figure 3:
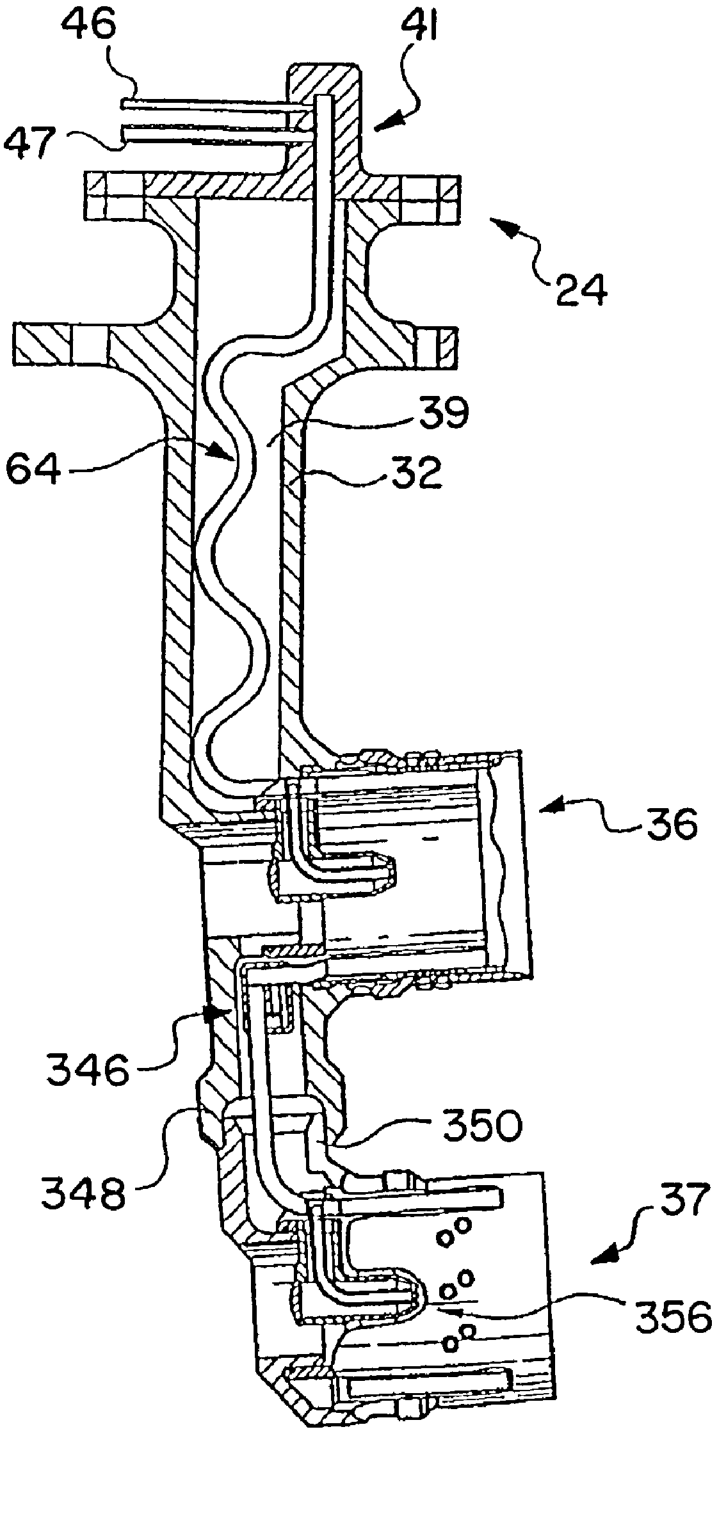
FIG. 3 is a cross-sectional view of the fuel injector of FIG. 2.

Referring now to FIGS. 2 and 3, each fuel injector 24, which are typically identical, includes a nozzle mount or flange 30 adapted to be fixed and sealed to the wall of the combustor casing (such as with appropriate fasteners); a housing stem 32 integral or fixed to flange 30 (such as by brazing or welding); and one or more nozzle assemblies such as at 36, 37, supported on stem 32. Stem 32 is generally cylindrical and includes an open inner chamber 39. The various components of the fuel injector 24 are preferably formed from material appropriate for the particular application as should be known to those skilled in the art.

An inlet assembly, indicated generally at 41, is disposed above or within the open upper end of chamber 39, and is integral with or fixed to flange 30 such as by brazing. Inlet assembly 41 is also formed from material appropriate for the particular application and includes inlet ports 46-49 which are designed to fluidly connect with a fuel manifold (not shown) to direct fuel into the injector 24.

Each of the nozzle assemblies 36, 37 is illustrated as including a pilot nozzle, indicated generally at 58, and a secondary nozzle, indicated generally at 59. Both nozzles 58, 59 are generally used during normal and extreme power situations, while only pilot nozzle 58 is generally used during start-up. Again, a pilot and secondary nozzle configuration is shown only for exemplary purposes.

An elongated fuel feed strip, indicated generally at 64, provides fuel from inlet assembly 41 to nozzle assemblies 36, 37. Feed strip 64 is an expandable feed strip formed from a material which can be exposed to combustor temperatures in the combustion chamber without being adversely affected. To this end, feed strip 64 has a convoluted (or tortuous) shape and includes a plurality of laterally-extending, regular or irregular bends or waves as at 65, along the longitudinal length of the strip from inlet end 66 to outlet end 69 to allows for expansion and contraction of the feed strip in response to thermal changes in the combustion chamber while reducing mechanical stresses within the injector. Although the convolutions allow expansion of the feed strip 64, they also tend to reduce the natural frequency of the feed strip 64.

By the term "strip", it is meant that the feed strip has an elongated, essentially flat shape (in cross-section), where the side surfaces of the strip are essentially parallel, and oppositely facing from each other; and the essentially perpendicular edges of the strip are also essentially parallel and oppositely-facing. The strip 64 has essentially a rectangular shape in cross-section (as compared to the cylindrical shape of a typical fuel tube), although this shape could vary slightly depending upon manufacturing requirements and techniques. The strip 64 is shown as having its side surfaces substantially perpendicular to the direction of air flow through the combustion chamber. This may block some air flow through the combustor, and in appropriate applications, the strip 64 may be aligned in the direction of air flow.

Feed strip 64 includes a plurality of inlet ports, where each port fluidly connects with inlet ports 46-49 in inlet assembly 41 to direct fuel into the feed strip 64. The inlet ports 46-49 feed multiple fuel paths down the length of the strip 64 to pilot nozzles and secondary nozzles in both nozzle assemblies 36, 37, as well as provide cooling circuits for thermal control in both nozzle assemblies. For ease of manufacture and assembly, the feed strip 64 and secondary nozzle 59 can be integrally connected to each other, and can be formed unitarily with one another, to define a fuel feed strip and nozzle unit.

The fuel combustion chamber and prior art fuel injectors described in FIGS. 1-3 are further described in commonly-assigned U.S. Pat. No. 6,711,898, which is hereby incorporated by reference herein in its entirety. Although these fuel injectors are adequate for use in many applications, the convoluted fuel feed strip 64 can be subject to resonance in certain applications.

Figure 4:
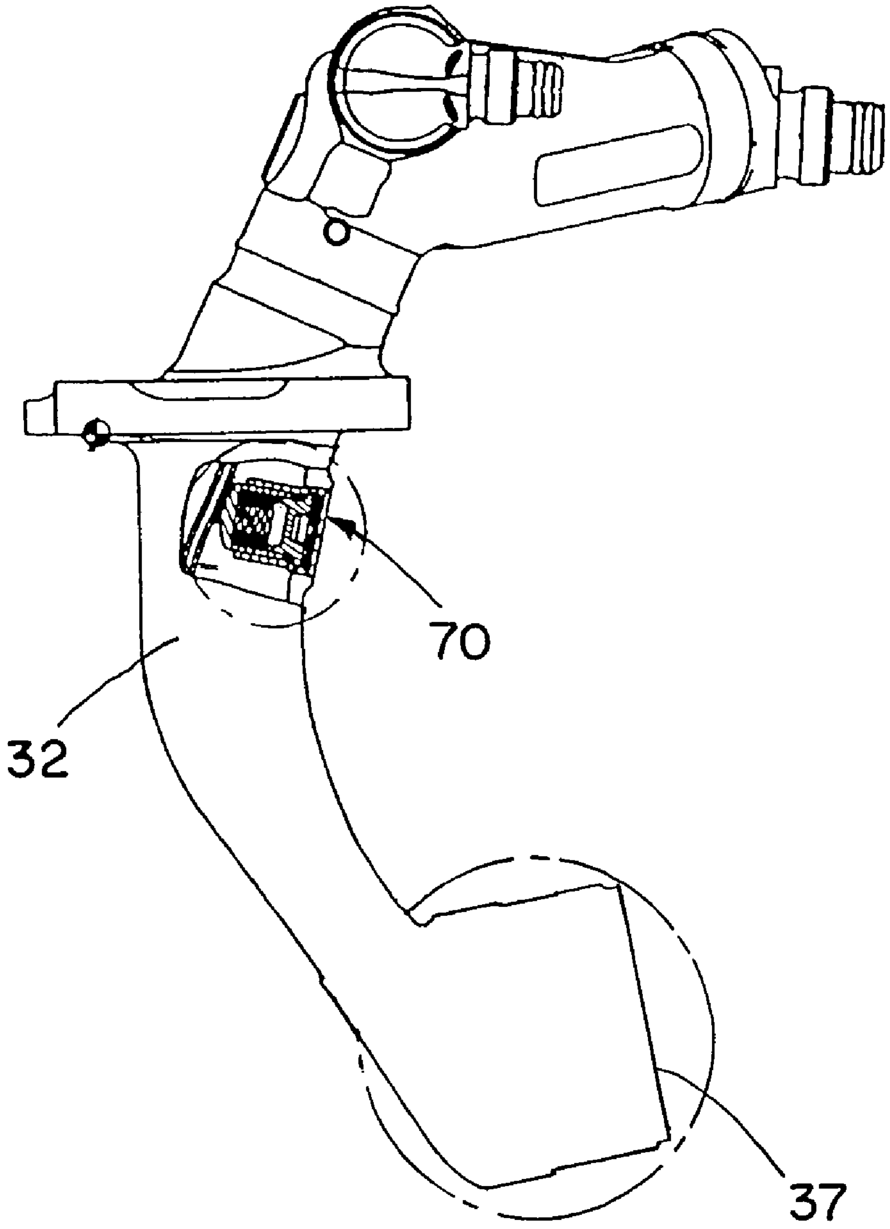
FIG. 4 is a side view of an exemplary fuel injector with a vibration damper assembly in accordance with the invention.

Turning now to FIG. 4, an injector 24 in accordance with an exemplary embodiment of the present invention will be described. The injector 24 is substantially similar to the injector described above (FIG. 3) except that the stem 32 and fuel feed strip 64 have a generally bowed shape, the injector 24 has a single nozzle 34, and the injector 24 includes a vibration damper 70. It will be appreciated, however, that the vibration dampers described herein can be utilized in conjunction with fuel supply members of a variety of shapes, including the fuel feed strip of FIG. 3, for example. Further, it will be appreciated that the following dampers can be installed in the location illustrated in FIG. 4, or any suitable location.

Figure 5:
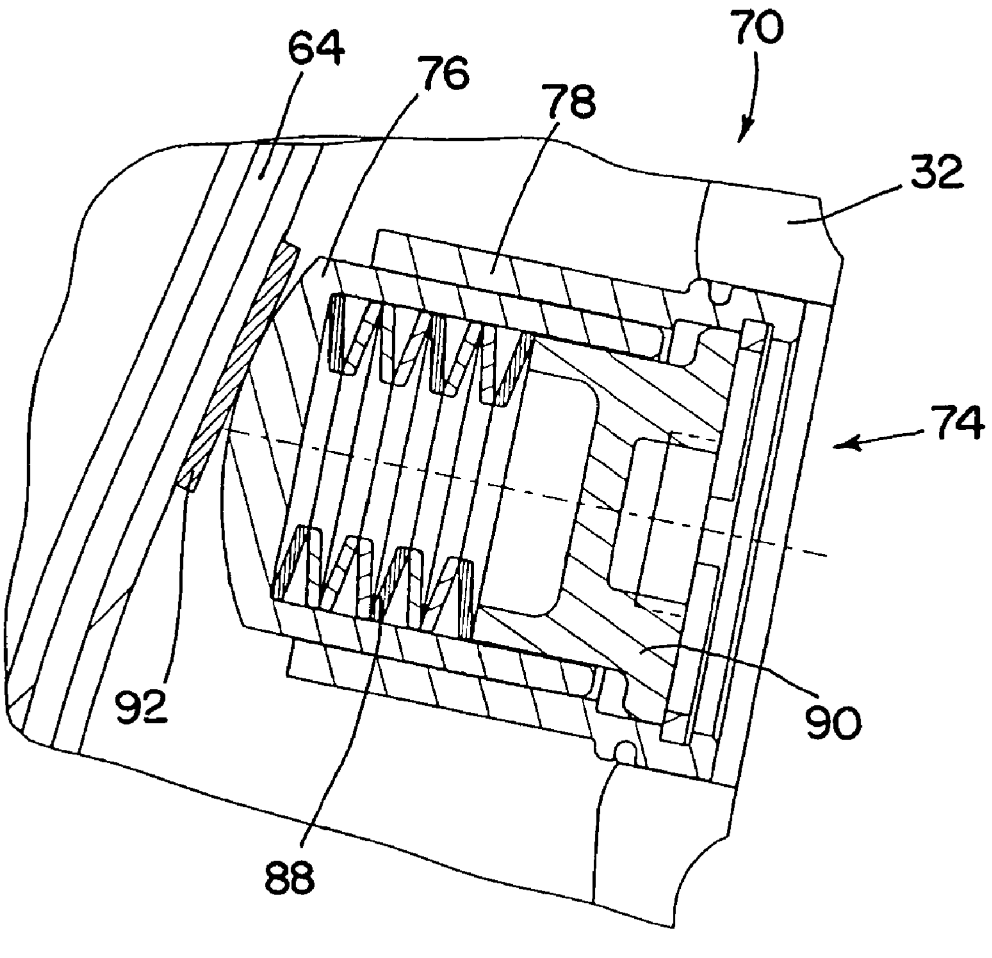
FIG. 5 is an enlarged portion of FIG. 4 illustrating the vibration damper in cross-section.

Turning to FIG. 5, the features of the vibration damper 70 will be described. The vibration damper 70 is supported by the housing 32 of the stem portion of the fuel injector 24. The vibration damper 70 can be generally cylindrical and can be provided with threads on an outer surface thereof for mating with threads on a corresponding surface of a bore 74 in the housing 32. The vibration damper 70 can also be welded and/or brazed to the housing 32, or otherwise secured in any suitable manner.

The vibration damper 70 includes a plunger member 76 supported within a sleeve 78 for axial movement. A plurality of spring washers 80, such as Cloversprings, are interposed between the plunger 76 and a spring retainer 90 for biasing the plunger 76 towards the fuel feed strip 64. A wear surface 92 is provided on the fuel feed strip 64 against which a surface of the plunger 76 engages. The wear surface 92 prevents the plunger 76 from damaging the fuel feed strip 64.

It will be appreciated that axial movement of the plunger 76 within the sleeve 78 frictionally damps movement of the fuel strip 64. The primary friction interface is between the sleeve 78 and plunger 76, however, friction between the individual spring washers 88 as well as between the plunger 76 and spring retainer 90 can also contribute to frictionally damping movement of the fuel feed strip 64.

The plunger 76 can be biased against the fuel feed strip 64 a prescribed amount by utilizing spring washers 88. For example, the plunger 76 can be biased against the fuel feed strip 64 such that a pre-load is applied to the fuel feed strip 64. Alternatively, the plunger 76 can be configured to minimally engage the wear surface 92 such that little or no pre-load is applied to the fuel feed strip 64.

It will be appreciated that although the damper 70 primarily damps movement of the fuel feed strip 64 in a direction horizontally across the page in FIG. 5, friction between the wear surface 92 and the plunger 76 can also damp movement of the fuel feed strip 64 in other directions, such as a direction normal to the plane of FIG. 5. For example, friction during relative movement between the fuel feed strip 64 and the plunger 76 can damp movement of the feed strip 64.

Figure 6:
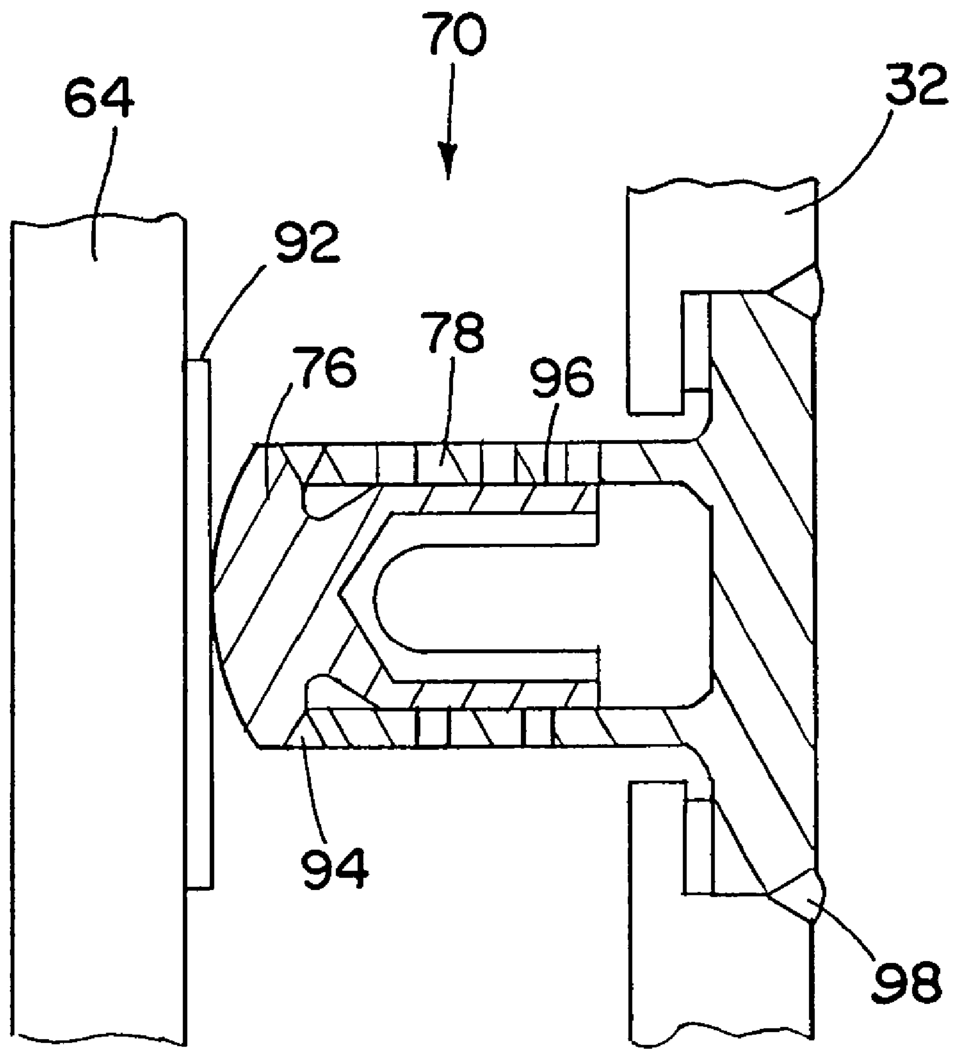
FIG. 6 is a cross-sectional view of another exemplary vibration damper assembly in accordance with the invention.

Turning now to FIG. 6, another vibration damper 70 in accordance with the invention is illustrated. In this embodiment, which is similar to the embodiment shown and described in FIG. 5 in that a plunger 76 engages a wear surface 92 of feed strip 64, the plunger 76 is supported for axial movement within a machined spring formed integrally with sleeve 78. The plunger 76 is secured to the machined spring via welds 94. A cylindrical outer surface 96 of the plunger 76 is configured to slide within sleeve 78 to thereby frictionally damp movement of the fuel feed strip 64. It will be appreciated that the machined spring compresses during movement of the plunger 76 thereby resisting movement of the fuel feed strip 64. The sleeve 78 can be secured to the stem portion of the housing 32 in any suitable manner such as via welding, as illustrated.

Figure 7:
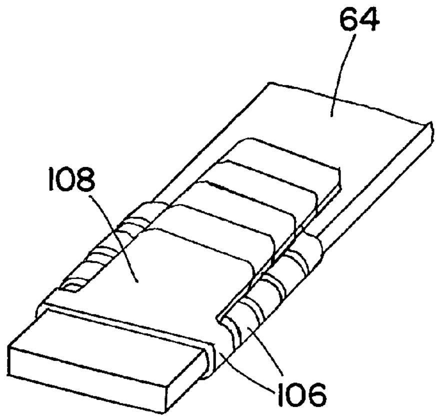
FIG. 7 is a perspective view of another exemplary vibration damper in accordance with the invention.
Figure 8:
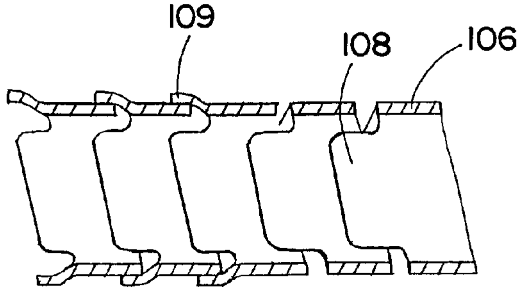
FIG. 8 is a partial cross-sectional view of the vibration damper of FIG. 7.

Turning now to FIGS. 7-10, and initially to FIGS. 7 and 8, another damper for frictionally damping a fuel supply member will be described. In FIG. 7, a plurality of frictionally engaged overlapping members 106 surround fuel feed strip 64. The frictionally engaged overlapping members 106 have a generally rectangular cross-section and include an axially extending friction tab 108 for engaging a surface of an adjacent frictionally engaged overlapping member 106. The frictionally engaged overlapping members 106 can be slidably interlinked together and at least one distal frictionally engaged member can be secured to the fuel feed strip 64. Alternatively, each individual frictionally engaged overlapping member 106 can be secured to the fuel feed strip 64. The frictionally engaged overlapping members 106 can be secured via welding or brazing, for example.

Once secured to the fuel feed strip 64, one or more of the plurality of frictionally engaged overlapping members 106 is configured to move in response to movement of the fuel feed strip 64 such that friction during relative movement of adjacent frictionally engaged overlapping members 106 damps movement of the fuel feed strip 64. Heat generated by the friction between the frictionally engaged overlapping members 106 is dissipated via the fuel feed strip 64 to the relatively cool fuel flowing therethrough. Some or all of the frictionally engaged overlapping members 106 can have overlapping edges 109.

Figure 9:
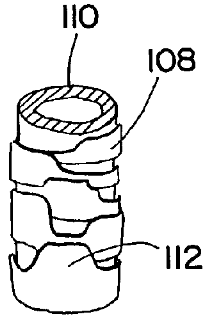
FIG. 9 is a perspective view of still another exemplary vibration damper in accordance with the invention.
Figure 10:
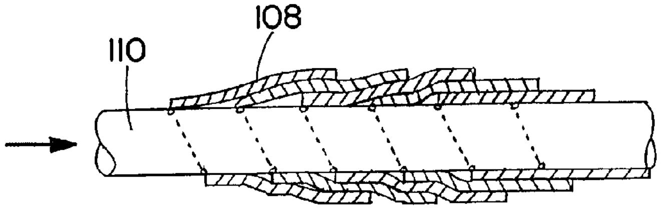
FIG. 10 is a partial cross-sectional view of the vibration damper of FIG. 9.

Turning to FIGS. 9 and 10, a similar embodiment is illustrated for damping movement of a fuel supply member, such as a tube 110. In this embodiment, the plurality of overlapping frictionally engaged members 108 have a generally cylindrical cross-sectional shape and surround the fuel supply member 110. The frictionally engaged overlapping members 108 can be individually secured to the fuel supply member 110 or can be slidably interlinked to one another and one or more distal frictionally engaged overlapping members 108 can be secured to the fuel supply member 110 such that movement of the fuel supply member 110 results in movement of one or more of the frictionally overlapping members 108 thereby damping movement of the fuel supply member 110. The frictionally engaged overlapping members 108 can include one or more friction tabs 112 for frictionally engaging a surface of an adjacent overlapping member 108.

Figure 11:
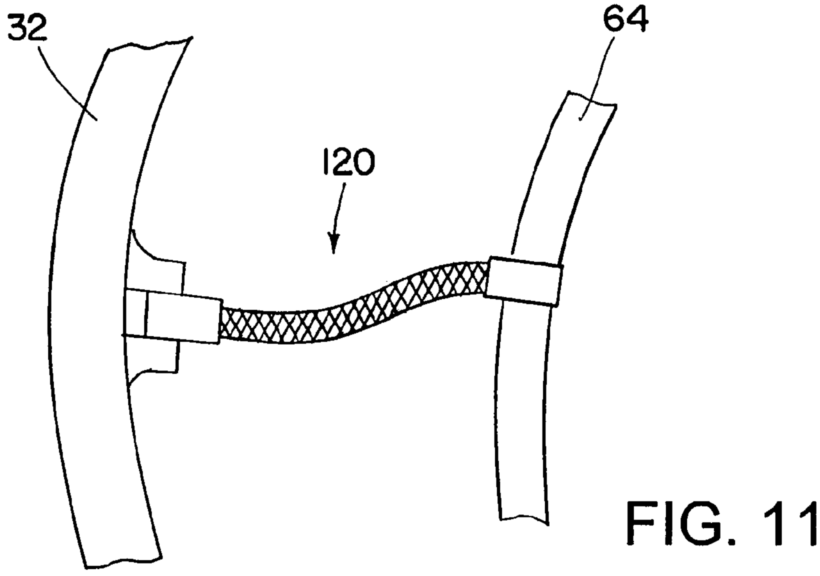
FIG. 11 is a cross-sectional view of yet another exemplary vibration damper assembly in accordance with the invention.

Turning now to FIG. 11, yet another embodiment of the invention is illustrated. In this embodiment a tether 120 is operatively connected to the fuel feed strip 64 and the housing 32 of the fuel injector 24 for damping movement of the fuel feed strip 64 and/or restricting movement of the fuel feed strip 64. In FIG. 11, the tether 120 is a braided tether, for example, a braided stainless steel tether, extending between the fuel feed strip 64 and the housing 32. It will be appreciated that the braided tether 120 damps movement of the fuel feed strip 64 via friction between individual strands within the braided tether 120. The tether 120 also functions to limit movement of the fuel feed strip 64 in one direction.

Figure 12:
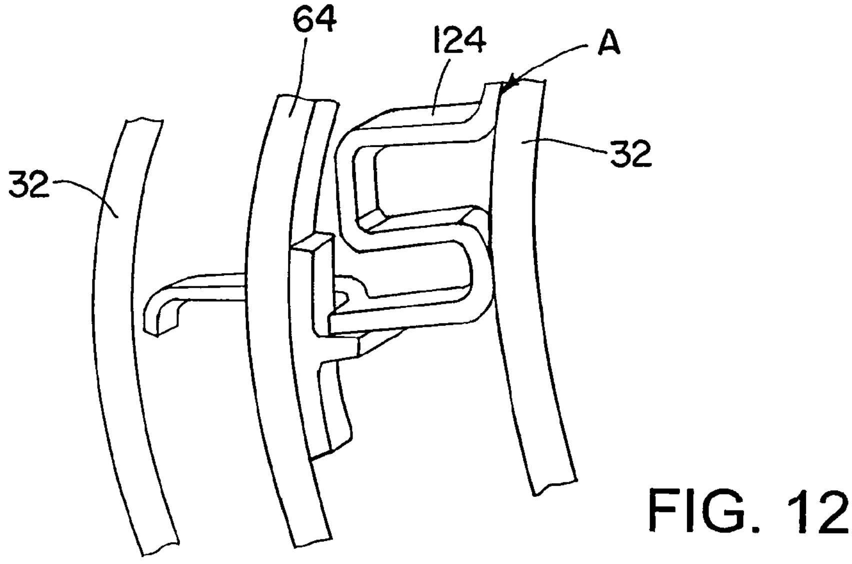
FIG. 12 is a perspective view of still yet another exemplary vibration damper assembly in accordance with the invention.
Figure 13:
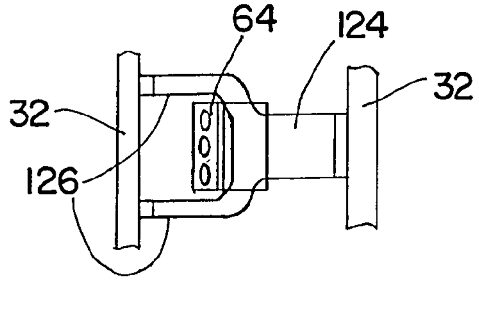
FIG. 13 is cross-sectional view of the vibration damper of FIG. 12.

Turning now to FIGS. 12 and 13, another embodiment in accordance with the invention is illustrated. In this embodiment movement of fuel feed strip 64 is damped by a damper member 124 having an S-shape spring portion secured to housing 32 at location A via a weld or braze, for example. The S-shape spring 124 is configured to engage opposing surfaces of the housing 32. A surface of the S-shape spring 124 frictionally engages a corresponding surface associated with fuel feed strip 64 to damp movement of the fuel feed strip 64. The S-shape spring 124 can be pre-loaded against the opposing surfaces of the housing 32 so as to maintain contact with the housing 32 during thermal expansion of housing 32.

It will be appreciated that the S-shape spring 124 allows movement of the fuel feed strip in the vertical direction in response to thermal expansion of the housing 34 while maintaining the frictional interface between the S-shape spring 124 and the corresponding surface associated with the fuel feed strip 64. Movement of the fuel feed strip 64 in a direction normal to the plane of the page is restricted by the S-shape spring 124, as is evident in FIG. 13, which illustrates a forked end portion 126 of the S-shape spring 124 that surrounds the fuel feed strip 64 to restrict movement of the fuel feed strip 64.

It will be appreciated that friction between the S-shape spring 124 and respective opposing sides of the housing 32 as well as friction between the S-shape spring 124 and the corresponding surface associated with the fuel feed strip 64 frictionally damps movement of the fuel feed strip 64 while accommodating thermal expansion of the housing 32 and/or movement of the fuel feed strip 64 in the longitudinal direction.

Figure 14:
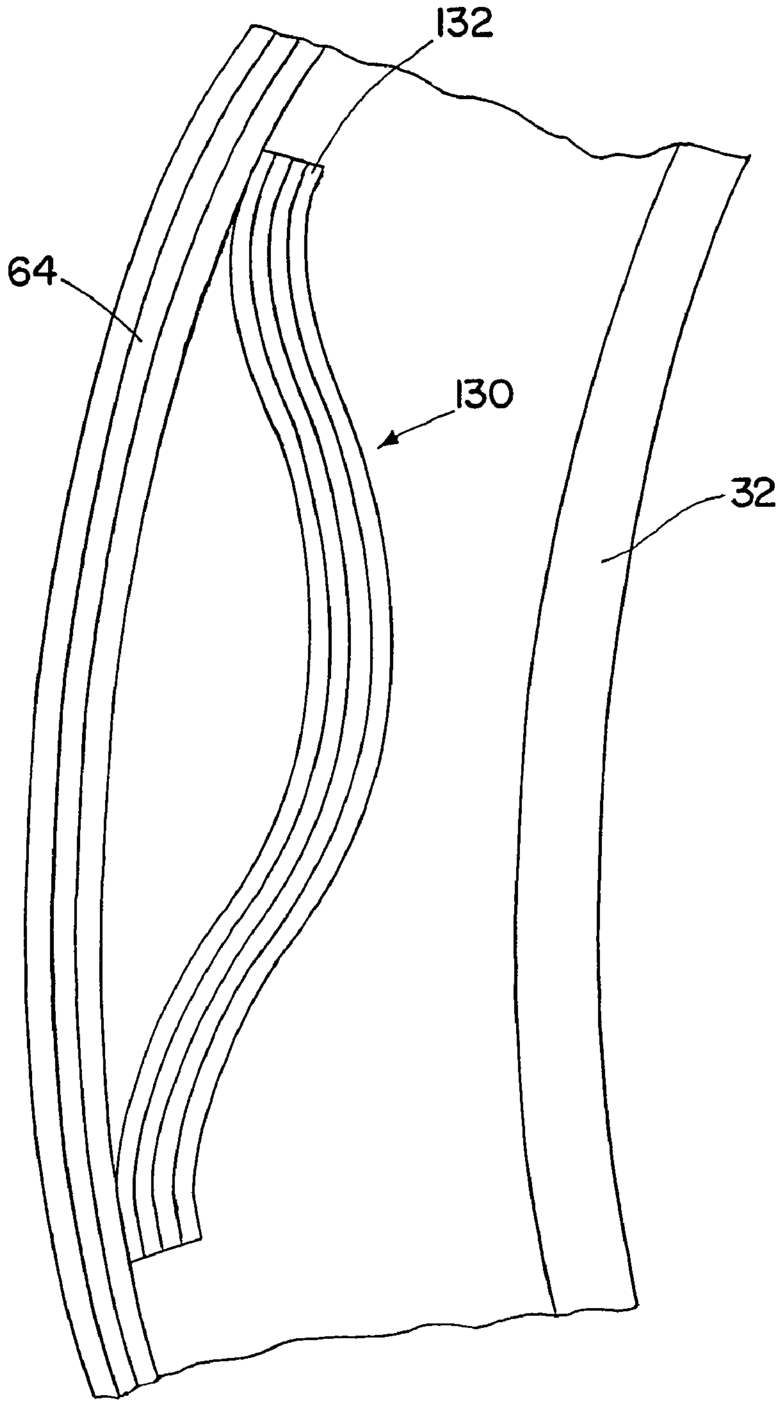
FIG. 14 is a cross-sectional view of another exemplary vibration damper assembly in accordance with the invention.

Turning now to FIG. 14, yet another embodiment in accordance with the invention is illustrated. In this embodiment a leaf spring 130 is secured to the fuel feed strip 64 to damp movement of the fuel feed strip 64. The leaf spring 130 is composed of several individual leaf spring elements 132 secured at their respective ends to the fuel feed strip 64. During flexure of the leaf spring 130, the individual leaf spring elements 132 move relative to one another thereby frictionally damping movement of the fuel feed strip 64.

It will be appreciated that the leaf spring 130 can be pre-loaded against the housing 32 if desired. Alternatively, one or more leaf springs 130 can extend between the fuel feed strip 64 and the housing 32.

It will be appreciated that although the invention has been shown and described in the context of a fuel supply member and/or fuel feed strip for a fuel injector for a gas turbine engine, principles of the invention are applicable to other parts and components of gas turbine engines as well as other machinery where parts and components are subject to resonance and/or high-cycle fatigue.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A gas turbine engine fuel injector assembly comprising a fuel nozzle, a fuel supply member for providing fuel to the nozzle connected to an end of the fuel supply member opposite an end configured for mounting in a gas turbine engine, and a damper operatively connected to the fuel supply member for damping movement of the fuel supply member, the damper including a plurality of mutually overlapping frictionally engaged members secured to the fuel supply member in at least one location along a length thereof such that at least one frictionally engaged member moves in response to movement of the fuel supply member, wherein friction during relative movement of individual frictionally engaged members damps movement of the fuel supply member.

2. A fuel injector assembly as set forth in claim 1, wherein at least one of the plurality of frictionally engaged members at least partially surrounds the fuel supply member.

3. A fuel injector assembly as set forth in claim 1, wherein each of the plurality of overlapping frictionally engaged members is secured to the fuel supply member.

4. A fuel injector assembly as set forth in claim 1, wherein the plurality of overlapping frictionally engaged members are slideably interlinked together, and wherein at least one distal frictionally engaged member is secured to the fuel supply member.

5. A fuel injector assembly as set forth in claim 1, wherein the fuel supply member is a tube and the frictionally engaged members are generally cylindrical in cross-section.

6. A fuel injector assembly as set forth in claim 5, wherein the generally cylindrical frictionally engaged members each surround the tube.

7. A fuel injector assembly as set forth in claim 1, wherein the fuel supply member is a fuel feed strip and the frictionally engaged members are generally rectangular in cross-section.

8. A fuel injector assembly as set forth in claim 1, wherein the fuel supply member is a fuel feed strip.

9. A fuel injector assembly as set forth in claim 1, wherein at least a plurality of the plurality of overlapping frictionally engaged members are secured to the fuel supply member by brazing or welding.

10. A fuel infector assembly as set forth in claim 1, wherein the overlapping frictionally engaged members include one or more friction tabs for frictionally engaging a surface of an adjacent overlapping frictionally engaged member.

11. A gas turbine engine comprising a combustion chamber and the fuel injector of claim 1 having the nozzle thereof disposed with the combustion chamber.

* * * * *